US008571919B2

(12) United States Patent
Rane et al.

(10) Patent No.: US 8,571,919 B2
(45) Date of Patent: Oct. 29, 2013

(54) SYSTEM AND METHOD FOR IDENTIFYING ATTRIBUTES OF A POPULATION USING SPEND LEVEL DATA

(75) Inventors: Rajendra R. Rane, Edison, NJ (US); Melissa Schwartz, Brooklyn, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 241 days.

(21) Appl. No.: 12/690,693

(22) Filed: Jan. 20, 2010

(65) Prior Publication Data

US 2011/0178842 A1 Jul. 21, 2011

(51) Int. Cl.
*G06Q 10/00* (2012.01)

(52) U.S. Cl.
USPC ........................................................ 705/7.33

(58) Field of Classification Search
USPC .............................................. 705/7.31, 7.33
See application file for complete search history.

(56) References Cited

U.S. PATENT DOCUMENTS

| | | | | |
|---|---|---|---|---|
| 5,548,749 A * | 8/1996 | Kroenke et al. ........................ 1/1 |
| 5,774,868 A * | 6/1998 | Cragun et al. ................ 705/7.31 |
| 5,949,044 A * | 9/1999 | Walker et al. ................... 235/379 |
| 5,966,695 A * | 10/1999 | Melchione et al. .......... 705/7.33 |
| 6,026,397 A * | 2/2000 | Sheppard .............................. 1/1 |
| 6,327,574 B1 | 12/2001 | Kramer et al. |
| 6,334,110 B1 | 12/2001 | Walter et al. |
| 6,430,539 B1 * | 8/2002 | Lazarus et al. ............... 705/7.31 |
| 6,839,682 B1 * | 1/2005 | Blume et al. ................. 705/7.31 |
| 6,850,896 B1 * | 2/2005 | Kelman et al. ............... 705/7.32 |
| 6,895,405 B1 * | 5/2005 | Choi et al. ............................. 1/1 |
| 6,925,441 B1 * | 8/2005 | Jones et al. ................... 705/7.33 |
| 7,035,855 B1 * | 4/2006 | Kilger et al. ................... 707/703 |
| 7,165,037 B2 * | 1/2007 | Lazarus et al. ............... 705/7.31 |
| 7,257,596 B1 * | 8/2007 | Williams et al. ...................... 1/1 |
| 7,376,603 B1 * | 5/2008 | Mayr et al. ....................... 705/35 |
| 7,398,270 B1 * | 7/2008 | Choi et al. ............................. 1/1 |
| 7,490,052 B2 * | 2/2009 | Kilger et al. ................. 705/7.31 |
| 7,533,038 B2 | 5/2009 | Blume et al. |
| 7,690,564 B2 * | 4/2010 | Rane et al. ..................... 235/380 |
| 8,027,891 B2 | 9/2011 | Preston et al. |
| 8,255,268 B2 * | 8/2012 | Rane et al. ................... 705/7.33 |
| 8,335,720 B2 * | 12/2012 | Juang et al. ................. 705/14.53 |
| 2002/0052776 A1 | 5/2002 | Rothman et al. |
| 2002/0077904 A1 | 6/2002 | Ali |
| 2004/0107205 A1 * | 6/2004 | Burdick et al. ............... 707/102 |

(Continued)

OTHER PUBLICATIONS

The evolution of relationship marketing: reaching an audience of one[PDF] from auburn.edu DW Bulger—Direct Marketing, 1999—auburn.edu.*

(Continued)

*Primary Examiner* — Jonathan G Sterrett
(74) *Attorney, Agent, or Firm* — Snell & Wilmer L.L.P.

(57) ABSTRACT

The present invention improves upon existing systems and methods by providing a passive profile creation method. The data accessible to a financial processor, such as spend level data, is leveraged using sophisticated data clustering and/or data appending techniques. Associations are established among entities (e.g., consumers), among merchants, and between entities and merchants. In one embodiment, a system and method for passively collecting spend level data for a transaction of a first entity, aggregating the collected spend level data for a plurality of entities; and clustering the first entity with a subset of the plurality of entities, based on aggregated spend level data of the first entity is provided.

18 Claims, 12 Drawing Sheets

(56) References Cited

U.S. PATENT DOCUMENTS

| | | | |
|---|---|---|---|
| 2004/0138958 A1* | 7/2004 | Watarai et al. | 705/26 |
| 2005/0159996 A1 | 7/2005 | Lazarus et al. | |
| 2005/0197954 A1* | 9/2005 | Maitland et al. | 705/39 |
| 2007/0118419 A1 | 5/2007 | Maga et al. | |
| 2007/0156530 A1* | 7/2007 | Schmitt et al. | 705/14 |
| 2007/0168246 A1 | 7/2007 | Haggerty et al. | |
| 2007/0179836 A1* | 8/2007 | Juang et al. | 705/10 |
| 2007/0244741 A1* | 10/2007 | Blume et al. | 705/10 |
| 2008/0306788 A1 | 12/2008 | Goyal | |
| 2008/0319829 A1* | 12/2008 | Hunt et al. | 705/10 |
| 2009/0076925 A1 | 3/2009 | DeWitt et al. | |
| 2009/0132347 A1* | 5/2009 | Anderson et al. | 705/10 |
| 2009/0287695 A1* | 11/2009 | Egan et al. | 707/5 |
| 2010/0088204 A1 | 4/2010 | Nambiar et al. | |
| 2010/0153242 A1* | 6/2010 | Preston et al. | 705/30 |
| 2010/0306032 A1 | 12/2010 | Jolley | |
| 2011/0093327 A1 | 4/2011 | Fordyce et al. | |
| 2011/0106607 A1 | 5/2011 | Alfonso et al. | |

OTHER PUBLICATIONS

KDD, Semma and Crisp-DM: a parallel overview[PDF] from iadis.net A Azevedo . . .—Proceedings of the IADIS European conf. data . . . , 2008—iadis.net.*

Identifying prospective customers[PDF] from buffalo.eduPB Chou, E Grossman, D Gunopulos . . .—Proceedings of the sixth . . . , 2000—dl.acm.org.*

Cross-channel customer mapping J Basak . . .—. . . and Information Science, 2008. ICIS 08 . . . , 2008—ieeexplore.ieee.org.*

USPTO; Office Action dated Mar. 20, 2012 in U.S. Appl. No. 12/690,759.

USPTO; Office Action dated Mar. 20, 2012 in U.S. Appl. No. 12/690,739.

USPTO; Office Action dated Mar. 26, 2012 in U.S. Appl. No. 12/690,669.

USPTO; Office Action dated May 17, 2012 in U.S. Appl. No. 12/690,772.

USPTO; Advisory Action dated Dec. 12, 2012 in U.S. Appl. No. 12/690,739.

USPTO; Final Office Action dated Dec. 21, 2012 in U.S. Appl. No. 12/690,712.

USPTO; Advisory Action dated Jan. 16, 2013 in U.S. Appl. No. 12/690,772.

USPTO; Final Office Action dated Feb. 4, 2013 in U.S. Appl. No. 12/690,669.

USPTO; Advisory Action dated Feb. 8, 2013 in U.S. Appl. No. 12/690,759.

USPTO; Advisory Action dated Feb. 26, 2013 in U.S. Appl. No. 12/690,712.

USPTO; Advisory Action dated Apr. 9, 2013 in U.S. Appl. No. 12/690,669.

USPTO; Final Office Action dated Aug. 16, 2012 in U.S. Appl. No. 12/690,798.

USPTO; Office Action dated Jun. 27, 2012 in U.S. Appl. No. 12/690,712.

USPTO; Notice of Allowance dated Jul. 16, 2012 in U.S. Appl. No. 12/690,810.

USPTO; Final Office Action dated Jul. 20, 2012 in U.S. Appl. No. 12/690,725.

USPTO; Final Office Action dated Jul. 20, 2012 in U.S. Appl. No. 12/690,784.

USPTO; Advisory Action dated Sep. 26, 2012 in U.S. Appl. No. 12/690,784.

USPTO; Advisory Action dated Oct. 12, 2012 in U.S. Appl. No. 12/690,725.

USPTO; Final Office Action dated Oct. 12, 2012 in U.S. Appl. No. 12/690,739.

USPTO; Final Office Action dated Oct. 29, 2012 in U.S. Appl. No. 12/690,759.

USPTO; Final Office Action dated Nov. 6, 2012 in U.S. Appl. No. 12/690,772.

USPTO; Advisory Action dated Nov. 8, 2012 in U.S. Appl. No. 12/690,798.

USPTO; Office Action dated Mar. 5, 2012 in U.S. Appl. No. 12/690,810.

USPTO; Office Action dated Jan. 6, 2012 in U.S. Appl. No. 12/690,712.

USPTO; Office Action dated Jan. 25, 2012 in U.S. Appl. No. 12/690,725.

USPTO; Office Action dated Mar. 15, 2012 in U.S. Appl. No. 12/690,784.

USPTO; Office Action dated Mar. 1, 2012 in U.S. Appl. No. 12/690,798.

* cited by examiner

*Illustration of percentiled data*

| CM | MCC 0742 | Percentile | ... | MCC 9402 | Percentile |
|---|---|---|---|---|---|
| CM1 | $ 532 | 26 | ... | $ 0 | 100 |
| CM2 | $1100 | 11 | ... | $ 100 | 40 |
| . | . | | ... | . | |
| . | . | | ... | . | |
| . | . | | ... | . | |
| CM100,000 | $ 0 | 100 | ... | $3200 | 2 |

FIGURE 3

SYSTEM AND METHOD FOR IDENTIFYING ATTRIBUTES OF A POPULATION USING SPEND LEVEL DATA

FIELD OF THE INVENTION

The present invention generally relates to using analytics and statistical analysis to categorize and draw inferences from data, and more particularly, to applying data collection, data aggregation, data clustering, and data appending, to spend level data in order to segment entities and draw inferences regarding those entities.

BACKGROUND OF THE INVENTION

Marketing expenses are often one of the largest cost categories for an organization. Marketing difficulties in effectively capturing and reaching the correct population of consumers is an industry wide problem, regardless of goods or services offered. In an attempt to overcome these difficulties, entities often engage in various advertising techniques to a broad audience hoping to reach interested consumers. However, such broad advertising techniques are often ignored by consumers or fail to reach the intended audience.

Using relevant data, population characteristics typically provide an effective form of targeted marketing by creating a shopping experience that is personalized and relevant to the consumer. However, targeted marketing systems are often limited to accessing a unique set of data that provide a holistic view of a consumer's spending habits and preferences. For instance, online retailer Amazon may have information regarding the products purchased by a particular consumer on their e-commerce site, but they lack the information on the type of products and services the same consumer purchases from other merchants.

However, generating population characteristics is often based on a subset of the population's responses to surveys, such as the U.S. census. This often leads to inaccurate results due to subjective categories, poor correlation of data, and responses based on a respondent's biased self image. Also, survey participation is time consuming and avoided by large subsets of the population. Such deficiencies often lead to gaps in the data.

Therefore, a long-felt need exists for a method to leverage the large amount of data available to some financial processors to provide an enhanced population segmentation and characteristics system.

SUMMARY OF THE INVENTION

The present invention improves upon existing systems and methods by providing a passive profile creation method. The data accessible to a financial processor, such as spend level data, is leveraged using sophisticated data clustering and/or data appending techniques. Associations are established among entities (e.g., consumers), among merchants, and between entities and merchants. In one embodiment, a system and method for passively collecting spend level data for a transaction of a first entity, aggregating the collected spend level data for a plurality of entities; and clustering the first entity with a subset of the plurality of entities, based on aggregated spend level data of the first entity is provided.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

FIG. 3 is an exemplary assigning of a weighted percentile to the spend level data of entities for a range of merchant category codes.

DETAILED DESCRIPTION OF EXEMPLARY EMBODIMENTS

Figure 1:
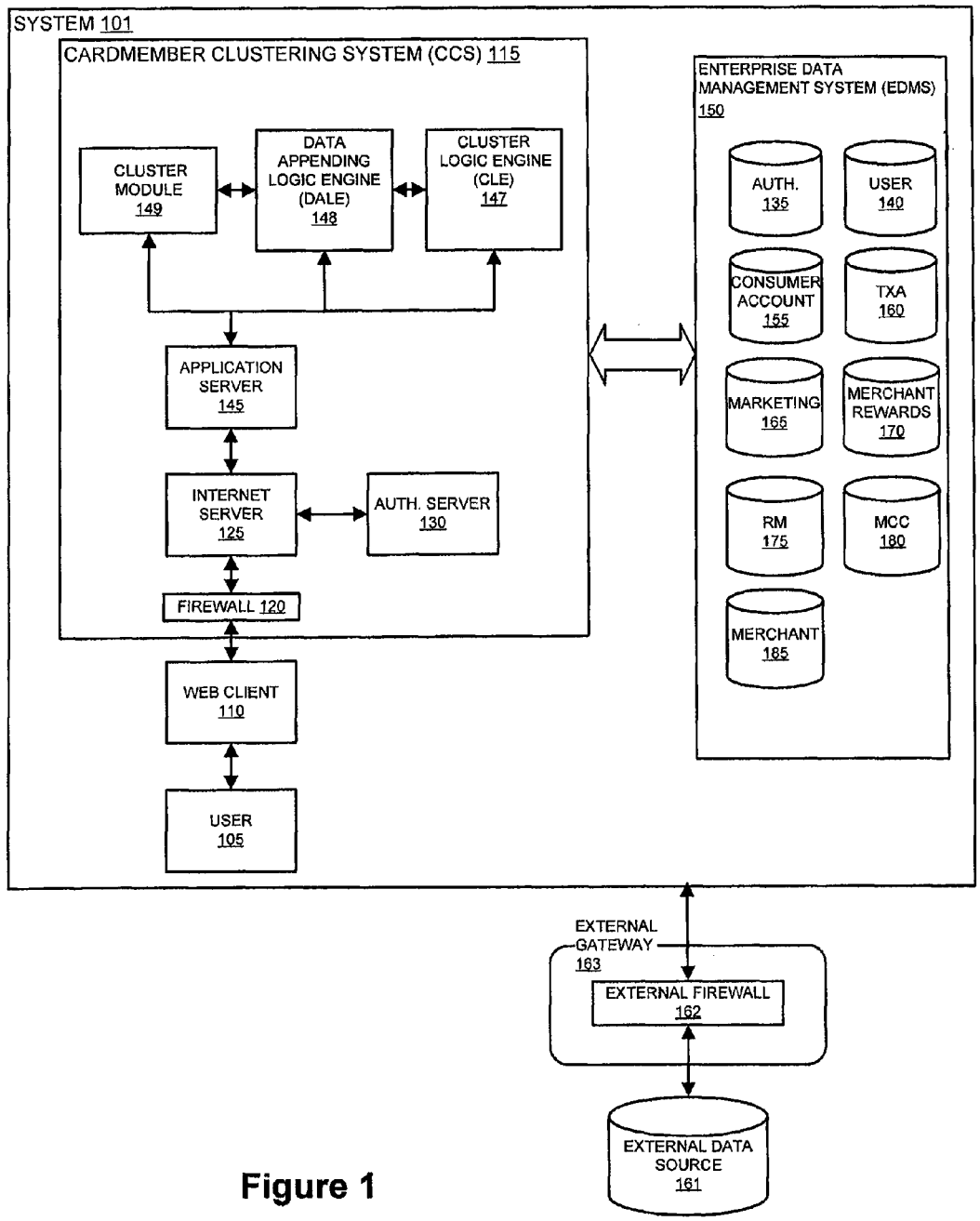
FIG. 1 is an overview of a representative system for segmenting entities in accordance with one embodiment of the present invention.

The detailed description of exemplary embodiments of the invention herein makes reference to the accompanying drawings, which show the exemplary embodiment for purposes of illustration and its best mode, and not of limitation. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process descriptions may be executed in any order and are not limited to the order presented. References to singular include plural, and references to plural include singular.

In one embodiment, a method and system for clustering entities (e.g., consumers) into groups using spend level data is disclosed. These clusters may be enriched with data known to a clustering host, or provided by one or more third parties. The clusters may be enriched with attribute, identification, preference, characteristic, demographic and/or other information. The enriched clusters may be analyzed and profile information of the clusters (e.g., aggregate cluster attributes, characteristics, demographics, and preferences) may be determined from the analysis. This profile information of the clusters may be used by the host and/or a third party such as a merchant and/or marketer. This profiled cluster information may be useful in matching entities with other entities, matching entities with merchants, matching merchants with entities, and matching merchant with other merchants. As used herein, "match" or similar terms may include an exact match, matching certain attributes, matching certain features, a partial match, matching a subset, substantially matching and/or any other association between items/entities.

The exemplary benefits provided by the representative embodiments include improved profiling techniques, enhanced population segmentation, increased accuracy of data, greater sources of data, larger data pools, less active consumer involvement, honed targeting marketing, increased consumer satisfaction and increased merchant satisfaction. For example, a host (e.g., financial processor) may take advantage of valuable spend level data to deliver enhanced value to merchants. This value may include identifying the merchant's positioning in the marketplace, targeting consumers, creating sell-in materials, initiating cross-promotional efforts, and tracking marketing success. These enhanced services of merchants may improve consumer satisfaction due to increased relevance of marketing efforts and the creation of new appropriate relationships. Furthermore, merchant loyalty to a host and merchant satisfaction is enhanced from the increased revenues.

While described in the context of systems and methods that enable segmenting of entities, practitioners will appreciate that certain embodiments may be similarly used to identify attributes and preferences of consumers, target consumers, target merchants, match merchants with consumers, match consumers with merchants, increase marketing performance, identify the preferences of a region, identify the preferences of a selected demographic, facilitate networking and create or enhance relationships.

While the description makes reference to specific technologies, system architectures and data management techniques, practitioners will appreciate that this description is but one embodiment and that other devices and/or methods may be implemented without departing from the scope of the invention. Similarly, while the description may make reference to a web client, practitioners will appreciate that other examples of collecting data, presenting data, gathering feedback and the like may be accomplished by using a variety of user interfaces including handheld devices such as personal digital assistants and cellular telephones. Furthermore, other communication and consumer interface methods such as direct mail, email, consumer invoices and targeted marketing may also be used to interface with the consumer without departing from the present invention.

While the system may contemplate upgrades or reconfigurations of existing processing systems, changes to existing databases and business information system tools are not necessarily required by the present invention.

"Entity" may include any individual, consumer, customer, group, business, organization, government entity, transaction account issuer or processor (e.g., credit, charge, etc), merchant, consortium of merchants, account holder, charitable organization, software, hardware, and/or any other entity.

An "account", "account number" or "consumer account" as used herein, may include any device, code (e.g., one or more of an authorization/access code, personal identification number ("PIN"), Internet code, other identification code, and/ or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a transponder and RFID reader in RF communication with the transponder (which may include a fob). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A consumer account number may be, for example, a sixteen-digit credit card number, although each credit provider has its own numbering system, such as the fifteen-digit numbering system used by American Express. Each company's credit card numbers comply with that company's standardized format such that the company using a fifteen-digit format will generally use three-spaced sets of numbers, as represented by the number "0000 000000 00000". The first five to seven digits are reserved for processing purposes and identify the issuing bank, card type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of card acceptance, account reconciliation, reporting, or the like.

A "transaction account" ("TXA") includes any account that may be used to facilitate a financial transaction. A "TXA issuer" includes any entity that offers TXA services to consumers.

"Transaction data" ("TX data") includes data that is captured and stored related to a financial transaction. This may include, quantity of item purchased per transaction, type of item purchased per transaction, dollar amount of item purchased per transaction, demographic identifier related to each item per transaction, demographic identifier related to each merchant per transaction; industry related to item per transaction, discount received per transaction, industry related to service per transaction, unique discount utilized per transaction, method of payment per transaction, merchant zip code, loyalty points accrued per transaction, time of a transaction, item purchased per transaction, service purchased per transaction, merchant category code per transaction, unique merchant identifier per transaction, transaction account data, transaction account type, transaction account spending frequency, transaction account payment history, financial processor and total amount of a transaction. TX data may be stored to a TXA database.

A "consumer" includes any software, hardware, and/or entity that consume products or services.

"Consumer account data" includes data related to a consumer account which may be stored in a database. Consumer account data includes stored information on consumer transaction accounts such as consumer demographic information, authorized merchant information, rewards program information, merchant patronage frequency, entity size of wallet, entity age, entity occupation, entity race, entity gender, entity profession, entity home location, entity business location, entity home zip code, entity business zip code, location of past transaction account transactions, number of children per entity, entity type of home, entity marital status, entity product preference, entity merchant class preference, entity merchant sub-class preference, transaction account past patronage from merchant class, entity credit score, consumer attributes, consumer name, and/or any other information that enables sophisticated profiling methods. Consumer account data may be stored to the consumer account database.

"Spend level data" includes TX data and/or consumer account data.

"Characteristic data" includes data stored relating to an entity. Characteristic data may be acquired by a host, such as a financial processor or from one or more third parties. Characteristic data may include age information, gender information, tenure information, martial status information, domicile information, family information, debt information, social networking data, survey data, purchasing power information, size of wallet information, travel information, religious affiliation information, hobby information, employer information, employment information, vocational information, sexual orientation information, education information, ethnicity information, handicap status information, political affiliation information, government data, merchant rewards system data, third-party data, credit bureau data, geographic information data, census bureau data, TXA data from other financial processors, affinity group information, income information, and/or any other data source that provides direct or indirect information on an entity. Characteristic data may be stored to the relationship management database (RM) 175.

A "target consumer" includes any consumer that comprises characteristics and preferences identified as desirable by a merchant.

A "merchant" includes any software, hardware and/or entity that receives payment or other consideration, provides a product or a service or otherwise interacts with a consumer. A merchant may further include a payee that has agreed to accept a payment card issued by a payment card organization as payment for goods and services. For example, a merchant may request payment for services rendered from a consumer who holds an account with a TXA issuer.

A "financial processor" may include any entity which processes information or transactions, issues consumer accounts, acquires financial information, settles accounts, conducts dispute resolution regarding accounts, and/or the like.

A "trade" or "tradeline" includes a credit or charge vehicle typically issued to an individual consumer by a credit grantor. Types of tradelines include, for example, bank loans, TXAs, personal lines of credit and car loans/leases. Credit bureau data includes any data retained by a credit bureau pertaining to a particular consumer. A credit bureau is any organization that collects and/or distributes consumer data. A credit bureau may be a consumer reporting agency. Credit bureaus generally collect financial information pertaining to consumers. Credit bureau data may include consumer account data, credit limits, balances, and payment history. Credit bureau data may include credit bureau scores that reflect a consumer's creditworthiness. Credit bureau scores are developed from data available in a consumer's file, such as the amount of lines of credit, payment performance, balance, and number of tradelines. This data is used to model the risk of a consumer over a period of time using statistical regression analysis. In one embodiment, those data elements that are found to be indicative of risk are weighted and combined to determine the credit score. For example, each data element may be given a score, with the final credit score being the sum of the data element scores.

A "user" 105 may include any individual or entity that interacts with system 101. User 105 may perform tasks such as requesting, retrieving, updating, analyzing, entering and/or modifying data. User 105 may be, for example, a consumer accessing a TXA issuer's online portal and viewing a bill that includes spend level data. User 105 may interface with Internet server 125 via any communication protocol, device or method discussed herein, known in the art, or later developed.

In one embodiment, user 105 may interact with the cardmember cluster system (CCS) 115 via an Internet browser at a web client 110. With reference to FIG. 1, the system includes a user 105 interfacing with a CCS 115 by way of a web client 110. Web client 110 comprises any hardware and/or software suitably configured to facilitate requesting, retrieving, updating, analyzing, entering and/or modifying data. The data may include spend level data or any information discussed herein. Web client 110 includes any device (e.g., personal computer) which communicates (in any manner discussed herein) with the CCS 115 via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers and/or the like. Practitioners will appreciate that the web client 110 may or may not be in direct contact with the CCS 115. For example, the web client 110 may access the services of the CCS 115 through another server, which may have a direct or indirect connection to Internet server 125.

The invention contemplates uses in association with billing systems, electronic presentment and payment systems, consumer portals, business intelligence systems, reporting systems, web services, pervasive and individualized solutions, open source, biometrics, mobility and wireless solutions, commodity computing, cloud computing, grid computing and/or mesh computing. For example, in an embodiment, the web client 110 is configured with a biometric security system that may be used for providing biometrics as a secondary form of identification. The biometric security system may include a transaction device and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

The user 105 may communicate with the CCS 115 through a firewall 120 to help ensure the integrity of the CCS 115 components. Internet server 125 may include any hardware and/or software suitably configured to facilitate communications between the web client 110 and one or more CCS 115 components.

Authentication server 130 may include any hardware and/or software suitably configured to receive authentication credentials, encrypt and decrypt credentials, authenticate credentials, and/or grant access rights according to pre-defined privileges attached to the credentials. Authentication server 130 may grant varying degrees of application and data level access to users based on information stored within the authentication database 135 and the user database 140.

Application server 145 may include any hardware and/or software suitably configured to serve applications and data to a connected web client 110. The cluster logic engine 147 (CLE) is configured to segment entities. The segmenting methods include, for example, collaborative filtering, clustering, profiling, predictive and descriptive modeling, data mining, text analytics, optimization, simulation, experimental design, forecasting and/or the like. The CLE 147 may be configured to reveal patterns, anomalies, key variables and relationships. The data appending logic engine 148 (DALE) is configured to append segmented entities with additional descriptive data. Cluster module 149 is configured to format, sort, report or otherwise manipulate data to prepare it for presentment to the user 105. Additionally, DALE 148, CLE 147 and/or cluster module 149 may include any hardware and/or software suitably configured to receive requests from each other, the web client 110 via Internet server 125 and the application server 145. CLE 147, DALE 148 and cluster module 149 are further configured to process requests, execute transactions, construct database queries, and/or execute queries against databases within enterprise data management system ("EDMS") 150, other system 101 databases, external data sources and temporary databases, as well as exchange data with other application modules, such as those provided by SAS (not pictured in FIG. 1). In one embodiment, the CLE 147, DALE 148 and/or cluster module 149 may be configured to interact with other system 101 components to perform complex calculations, retrieve additional data, format data into reports, create XML representations of data, construct markup language documents, and/or the like. Moreover, the CLE 147, DALE 148 and/or cluster module 149 may reside as a standalone system or may be incorporated with the application server 145 or any other CCS 115 component as program code.

FIG. 1 depicts databases that are included in an exemplary embodiment. A representative list of various databases used herein includes: an authentication database 135, a user database 140, a consumer account database 155, a TXA database 160, a marketing database 165, a merchant rewards database 170, a relationship management database 175, a merchant category code database 180, a merchant database 185, an external data source 161 and/or other databases that aid in the functioning of the system. As practitioners will appreciate, while depicted as a single entity for the purposes of illustration, databases residing within system 101 may represent multiple hardware, software, database, data structure and networking components. Authentication database 135 may store information used in the authentication process such as, for example, user identifiers, passwords, access privileges, user preferences, user statistics, and the like. The user database 140 maintains user information and credentials for CCS 115 users. The consumer account database stores information on consumer transaction accounts such as consumer demographic information, authorized merchant information, rewards program information and any other information that enables making charges to a consumer transaction account and/or enables sophisticated profiling methods. The transaction TXA database 160 stores financial transactions and/or spend level data. The marketing database 165 stores information regarding marketing and promotional programs. The merchant rewards database 170 stores information related to consumer rewards and incentive programs. The relationship management ("RM") database 175 stores strategic information regarding current, past and present consumers, such as characteristic data.

The merchant category code ("MCC") database 180 stores codes that indicate an industry associated with a merchant. In one embodiment, the industry code is an MCC code. A industry code may be a classification code that is assigned by a payment card organization to a merchant. For instance, there may be 285 distinct MCCs. The payment card organization assigns the merchant a particular code based on the predominant business activity of the merchant. An industry code is the number that corresponds to, and identifies, a merchant in the same business as a merchant assigned a particular MCC. A merchant database 185 stores merchant attributes. As practitioners will appreciate, embodiments are not limited to the exemplary databases described herein, nor do embodiments necessarily utilize each of the disclosed exemplary databases.

In addition to the components described above, the system 101, the CCS 115 and the EDMS 150 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

As will be appreciated by one of ordinary skill in the art, one or more system 101 components may be embodied as a customization of an existing system, an add-on product, upgraded software, a stand-alone system (e.g., kiosk), a distributed system, a method, a data processing system, a device for data processing, and/or a computer program product. Accordingly, individual system 101 components may take the form of an entirely software embodiment, an entirely hardware embodiment, or an embodiment combining aspects of both software and hardware. Furthermore, individual system 101 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

As those skilled in the art will appreciate, the web client 110 includes an operating system (e.g., Windows NT, 95/98/2000, OS2, UNIX, Google Chrome, Plan 9, Linux, Solaris, MacOS, etc.) as well as various conventional support software and drivers typically associated with computers. Web client 110 may include any suitable personal computer, network computer, workstation, minicomputer, mainframe, mobile device or the like. Web client 110 can be in a home or business environment with access to a network. In an embodiment, access is through a network or the Internet through a commercially available web-browser software package. Web client 110 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network.

Firewall 120, as used herein, may comprise any hardware and/or software suitably configured to protect the CCS 115 components from users of other networks. Firewall 120 may reside in varying configurations including stateful inspection, proxy based and packet filtering, among others. Firewall 120 may be integrated as software within Internet server 125, any other system components, or may reside within another computing device or may take the form of a standalone hardware component.

Internet server 125 may be configured to transmit data to the web client 110 within markup language documents. As used herein, "data" may include encompassing information such as commands, queries, files, data for storage, and/or the like in digital or any other form. Internet server 125 may operate as a single entity in a single geographic location or as separate computing components located together or in separate geographic locations. Further, Internet server 125 may provide a suitable web site or other Internet-based graphical user interface, which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Like Internet server 125, the application server 145 may communicate with any number of other servers, databases and/or components through any means known in the art. Further, the application server 145 may serve as a conduit between the web client 110 and the various systems and components of the CCS 115. Internet server 125 may interface with the application server 145 through any means known in the art including a LAN/WAN, for example. Application server 145 may further invoke software modules such as the CLE 147, DALE 148 and/or the cluster module 149 in response to user 105 requests.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (http://yahoo.com/stockquotes/ge) and an internet protocol ("IP") address. The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

Any database depicted or implied by FIG. 1, or any other database discussed herein, may include any hardware and/or software suitably configured to facilitate storing identification, authentication credentials, and/or user permissions. One skilled in the art will appreciate that system 101 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In an embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the system by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second parties. Each of the three data sets in this example may contain different information that is stored using different data storage formats and/or techniques. Further, each data set may contain subsets of data that also may be distinct from other subsets.

As stated above, in various embodiments of system 101, the data can be stored without regard to a common format. However, in one embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 101 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 101 may consist of any combination thereof at a single location or at multiple locations, wherein each database or system includes any of various suitable security features, such as firewalls, access codes, encryption, decryption, compression, decompression, and/or the like.

The system 101 may be interconnected to an external data source 161 (for example, to obtain data, such as spend level data from a merchant) via a second network, referred to as the external gateway 163. The external gateway 163 may include any hardware and/or software suitably configured to facilitate communications and/or process transactions between the system 101 and the external data source 161. Interconnection gateways are commercially available and known in the art. External gateway 163 may be implemented through commercially available hardware and/or software, through custom hardware and/or software components, or through a combination thereof. External gateway 163 may reside in a variety of configurations and may exist as a standalone system or may be a software component residing either inside EDMS 150, the external data source 161 or any other known configuration. External gateway 163 may be configured to deliver data directly to system 101 components (such as CLE 147 and/or DALE 148) and to interact with other systems and components such as EDMS 150 databases. In one embodiment, the external gateway 163 may comprise web services that are invoked to exchange data between the various disclosed systems. The external gateway 163 represents existing proprietary networks that presently accommodate data exchange for data such as financial transactions, consumer demographics, billing transactions and the like. The external gateway 163 is a closed network that is assumed to be secure from eavesdroppers.

The invention may be described herein in terms of functional block components, screen shots, optional selections and various processing steps. It should be appreciated that such functional blocks may be realized by any number of hardware and/or software components configured to perform the specified functions. For example, system 101 may employ various integrated circuit components, e.g., memory elements, processing elements, logic elements, look-up tables, and/or the like, which may carry out a variety of functions under the control of one or more microprocessors or other control devices. Similarly, the software elements of system 101 may be implemented with any programming or scripting language such as C, C++, Java, COBOL, assembler, PERL, Visual Basic, SQL Stored Procedures, extensible markup language (XML), cascading style sheets (CSS), extensible style sheet language (XSL), with the various algorithms being implemented with any combination of data structures, objects, processes, routines or other programming elements. Further, it should be noted that system 101 may employ any number of conventional techniques for data transmission, signaling, data processing, network control, and/or the like. Still further, system 101 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

In one embodiment, the system includes provided data, a graphical user interface (GUI), a software module, logic engines, databases and computer networks. The provided data may include spend level data and/or characteristic data. System 101 may include a cardmember clustering system (CCS) 115. CCS 115, may include a cluster logic engine (CLE) 147, a data appending logic engine (DALE) 148, and/or a cluster module 149. System 101 may also include an enterprise data management system (EDMS) 150 containing multiple databases.

Referring now to the Figures, the block system diagrams and process flow diagrams represent mere embodiments of the invention and are not intended to limit the scope of the invention as described herein. For example, the steps recited in FIGS. 2 and 4-12 may be executed in any order and are not limited to the order presented. It will be appreciated that the following description makes appropriate references not only to the steps depicted in FIGS. 2 and 4-12, but also to the various system components as described above with reference to FIG. 1.

Figure 2:
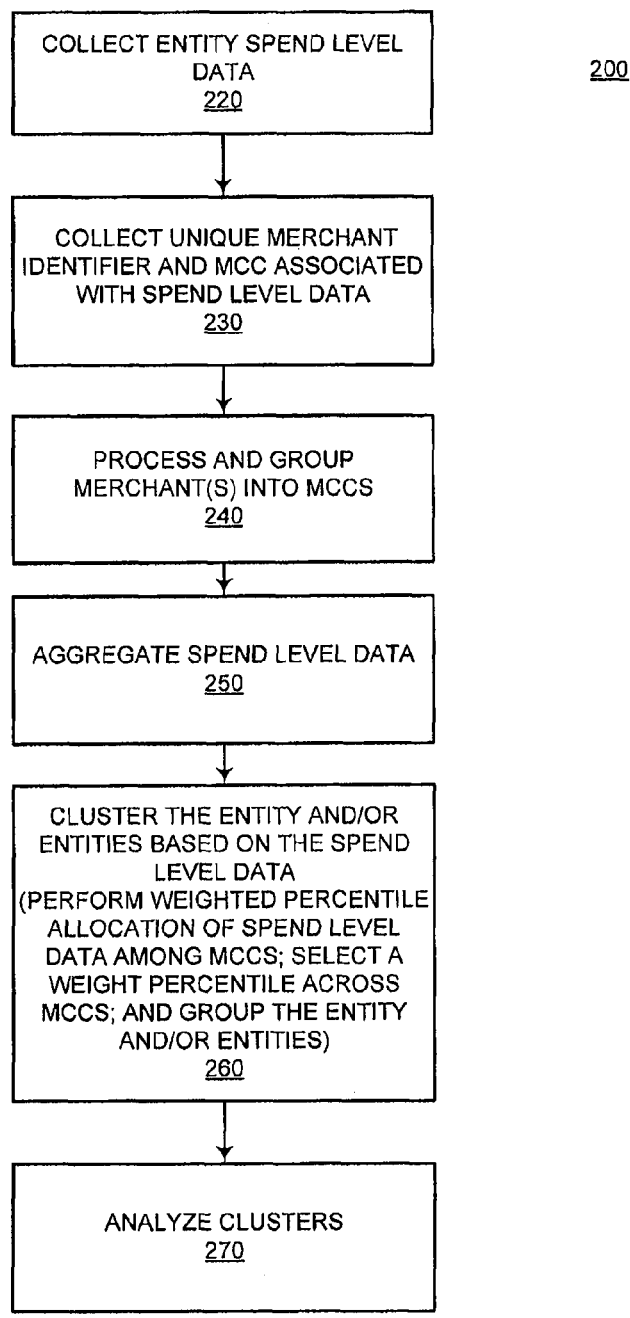
FIG. 2 is a representative process flow diagram for generating a cluster of entities based on spend level data, in accordance with one embodiment of the present invention.

In one exemplary embodiment, with reference to FIG. 2, spend level data may be collected for use in segmenting entities (220). An entity may be a consumer. In one embodiment, a merchant may collect spend level data for a portion or all transactions by certain entities, by using each entity's consumer account and/or TXA over a period and/or periods. In one embodiment, spend level data includes TXA data and/or consumer account data.

The collection of the spend level data may be passive. For instance, passively collecting spend level data of an entity includes acquiring the spend level data in response to a transaction by the first entity with a merchant. In an embodiment, the spend level data may be integral to information processed in a transaction for goods and/or services with a merchant. For instance, a survey and/or survey responses are not needed to capture spend level data, but such data may be used to supplement the data discussed herein. In one embodiment, collecting the spend level data may include acquiring the spend level data from a merchant. In an embodiment, passively collecting the spend level data of an entity includes collecting the spend level data from a transaction database. In yet an embodiment, passively collecting the spend level data includes at least one of reconciling the spend level data, transferring the spend level data to a host, organizing spend level data into a format, saving the spend level data to a memory, gathering the spend level data from the memory, or saving the spend level data to a database. For instance, if an entity performs a transaction (such as by using a transaction account), spend level data (such as TX data and/or consumer account data) related to the transaction may be captured and stored in a memory, database, and/or multiple databases. Spend level data (such as TX data and/or consumer account data) may be stored locally with the merchant, remotely by the merchant and/or transmitted to a remote host (e.g., financial processor) for storing and processing.

In one exemplary embodiment with renewed reference to FIG. 1, spend level data may be segmented by type, as appropriate, and may be transmitted to, and stored in, a database and/or a plurality of databases (e.g., consumer account database 155, TXA database 160, merchant rewards database 170, RM database 175, MCC database 180 and/or merchant database 185). For instance, TX data (such as the total amount of a transaction) may be transmitted to and saved in TXA database 160, while merchant rewards data (such as merchant rewards accrued per transaction) may be transmitted to and saved in merchant rewards database 170. Spend level data may be transferred to a host at any suitable time. For instance, spend level data may be transferred to a host periodically, such as at the end of every day. In an embodiment, spend level data may be transferred to a host in response to a request, such as a request by a host. In yet an embodiment, a host may collect the spend level data.

Merchants may have a unique identifier designated by a host and/or financial processor (230). In one embodiment, this unique identifier is a service establishment (SE) number. The location, name, store number, industry, tenure and other suitable merchant specific information may be tied to the unique SE number of a merchant. Each merchant may also be designated a MCC based on the business activity of the merchant (240). This MCC may be designated at any time; however, a MCC is normally established prior to a merchant accepting transactions with entities having a TXA. The MCC of a merchant may change if the goods and/or services offered by the merchant changes.

In one embodiment, aggregating the collected spend level data includes combining a selectable range of collected spend level data (250). The selectable range may be a period of time, such as a time range. The period may be any suitable period and/or periods such as a minute, an hour, a period of hours, one day, one week, one month, a period of days, a period of months, one year, or more than one year. The periods may be consecutive or non-consecutive. In an embodiment, the selectable range may be a value, such as values of spend exceeding a pre-selected threshold. In an embodiment the selectable range may include frequency, such as spend level data occurring at a particular frequency.

With reference to FIG. 1, in one embodiment, when user 105 logs on to an application, Internet server 125 may invoke an application server 145. Application server 145 invokes logic in the CLE 147, DALE 148, cluster module 149 and/or other application, such as SAS software, by passing parameters relating to the user's 105 requests for data. The CCS 115 manages requests for data from the applications and communicates with system 101 components. Transmissions between the user 105 and the Internet server 125 may pass through a firewall 120 to help ensure the integrity of the CCS 115 components. Practitioners will appreciate that the invention may incorporate any number of security schemes or none at all. In one embodiment, the Internet server 125 receives page requests from the web client 110 and interacts with various other system 101 components to perform tasks related to requests from the web client 110. Internet server 125 may invoke an authentication server 130 to verify the identity of user 105 and assign specific access rights to user 105. In order to control access to the application server 145 or any other component of the CCS 115, Internet server 125 may invoke an authentication server 130 in response to user 105 submissions of authentication credentials received at Internet server 125. When a request to access system 101 is received from Internet server 125, Internet server 125 determines if authentication is required and transmits a prompt to the web client 110. User 105 enters authentication data at the web client 110, which transmits the authentication data to Internet server 125. Internet server 125 passes the authentication data to authentication server which queries the user database 140 for corresponding credentials. When user 105 is authenticated, user 105 may access various applications and their corresponding data sources.

In one embodiment, the entities are clustered based on spend level data. In one embodiment with reference to FIG. 3, clustering includes CLE 147 assigning a weighted percentile to the spend level data of an entity within MCCs for a plurality of MCCs. This weighted percentile may be assigned for all MCCs or a subset of MCCs. In an embodiment, clustering includes CLE 147 selecting a weight percentile across a merchant category codes. In one embodiment, the selected weight percentile may be any desired weight percentile. In one embodiment the selected weight percentile is the median percentile of each cluster. In an embodiment, the weight percentile is selected based upon a targeted outcome. For instance, a merchant may wish to target a specific type of entity by pre-selecting a particular distribution of percentile weights for each or for a subset of MCCs. This targeting process is further described in process flow diagram 400 described below.

In an embodiment, clustering includes CLE 147 grouping an entity with other entities based upon the selecting. In one embodiment, an entity's closeness to the median value of MCCs may determine to which cluster the entity is assigned.

CLE 147 is configured to process requests, execute transactions, construct database queries, and/or execute queries against databases within enterprise data management system ("EDMS") 150. For instance, in response to a direction of programming and/or a user 105, CLE 147 may execute a query of TXA database 160, and/or consumer account database 155 for spend level data. CLE 150 may aggregate spend level data for an entity over a specified time period. In one embodiment, the period is 12 months. A period of 12 months may assist with removing outlier effects, such as seasonal effects.

In response to a direction of a user 105, CLE 150 may execute a query of MCC database 180 for MCC information. In one embodiment, CLE 147 groups all merchants having transactions with entities over a period by their corresponding designated MCC. In one embodiment with renewed reference to FIG. 2, CLE 147 and/or CLE 147, in communication with SAS software, is configured to cluster entities (260). In one embodiment, a weighted percentile is assigned to each entity based on the entity's total value of spend to merchants within an assigned merchant category code. The percentile weights may be based on a distribution of payments made by all entities over a selected period to merchants within an assigned merchant category code. In one embodiment, each cluster comprises a median percentile value of spend for each industry. In one exemplary embodiment, an entity's closeness to the median values determines the entity's cluster membership. If the aggregate amount of spend within a MCC by an entity over a selected period results in a value X, and X is greater than the aggregate amount of spend within that MCC by all other entities, then the entity may be designated a percentile weight of 0. If the aggregate amount of spend within a MCC by an entity over a selected period results in a value 0, and 0 is less than the aggregate amount of spend within that MCC made by all other entities, then the spend level data of the entity may be designated a percentile weight of 100. In an embodiment, the spend level data of the highest spending entity is designated a percentile weight of 100 and the spend level data of the lowest spending entity is designated a value of 0. In yet an embodiment, if the aggregate amount of spend within a MCC by an entity over a selected period results in a value Y, Y is compared to the aggregate of amount of spend within that MCC by all other entities, and the spend level data of the entity may be designated a percentile weight between 0 and 100. This weighted percentile process may be performed for every MCC or for a subset of MCCs. This weighted percentile process may be performed for every for every entity transaction or for a subset of entity transactions. Each entity with spend level data may be assigned a cluster membership based on the entity's percentiled spend and/or weighted percentile in each industry category and/or MCC.

In an embodiment, clustering includes CLE 147 assigning a weighted percentile to the spend level data of an entity, for item types purchased by an entity for a plurality of item types. Clustering may include CLE 147 selecting a weight percentile across all item types. Clustering may include CLE 147 grouping an entity with other entities based upon the selecting.

In yet an embodiment, clustering includes CLE 147 assigning a weighted percentile to the spend level data of an entity, for demographic identifier related to each item purchased by an entity per transaction for a plurality of demographic identifiers related to each item purchased. Clustering may include CLE 147 selecting a weight percentile across all demographic identifiers related to each item purchased. Clustering may include CLE 147 grouping an entity with other entities based upon the selecting.

In one exemplary embodiment, an algorithm run by CLE 147 clusters an entity with other entities. Though any suitable number of clusters may be formed, in one exemplary embodiment, 30 clusters may be formed. In one embodiment, an entity is designated one cluster. In an embodiment, entities may be grouped in more than one cluster at the same time. Cluster group members may be as similar as possible to the same cluster's group members. In another exemplary embodiment, cluster group members are as dissimilar to other cluster group members as possible.

CM 149 is configured to format, sort, report or otherwise manipulate the cluster data to prepare it for presentation, and presentation to the user 105. This presentation may be via GUI, display, saved to a memory, printed, and/or output to an electronic device.

In one embodiment, the clusters or a portion of the clusters may be utilized for at least one of advertising, market research, media planning, public relations, product pricing, product distribution, consumer support, sales strategy, community involvement, marketing, directing an entity to goods, directing an entity to services, drawing inferences about a cluster, directing the first entity to a second entity, and/or research. For instance, the cluster information may be directly electronically inserted to preformatted marketing materials by the system 101. The cluster information may be directly transferred to a third party, such as an identified merchant and/or marketer, to be implemented as desired by the merchant and/or marketer.

In one embodiment, entities are clustered based upon available spend level data for each entity. Spend level data, within the cluster, among cluster members may be compared and/or analyzed by the CLE 147 (270). This comparison may assist in a determination and/or inference of attributes of the entities within the cluster group. A holistic picture of the cluster members may be generated based upon this comparison. Inferences may be made regarding what characteristics the cluster members have based on the aggregation of entity data. Inferences may be made regarding what types of activities cluster members prefer, based upon spend level data and/or types of activities the cluster members prefer to allocate their dollars towards. Inferences may be made regarding what type of lifestyle the entities have, based upon spend level data and/or what types of lifestyle the entities allocate their dollars towards. Inferences may be made regarding where the entity members are in life. In one embodiment, these inferences may be based value of spend data among MCC. In an embodiment, these inferences may be based on value of spend on a particular merchant or group of merchants within a cluster. In yet an embodiment, these inferences may be based on particular items purchased in transactions. In one embodiment, this system 101 creates a segmented portfolio of users over a broad range of industries based on spend level data captured during transactions with merchants. In an embodiment, system 101 segments users based data available to financial processors.

Spend level data within MCCs may assist in a determination and/or inference of the preferences, characteristics and attributes of the entities within a cluster. For instance, the MCC and/or MCC's receiving a high percentage of spend within a cluster may indicate preferences of the cluster members. In an embodiment, the MCC and/or MCC's receiving a low percent of spend within a cluster may indicate cluster members dislike of and/or a low relevance of the merchants offering within the MCC to the cluster members. In an embodiment, a merchant receiving the largest proportion of cluster member patronage may be preferred by other members of the cluster. Cluster members who had not previously performed transactions with a merchant, such as the merchant with the identified largest proportion of cluster member patronage, may be targeted for future targeted marketing efforts by that merchant.

Figure 4:
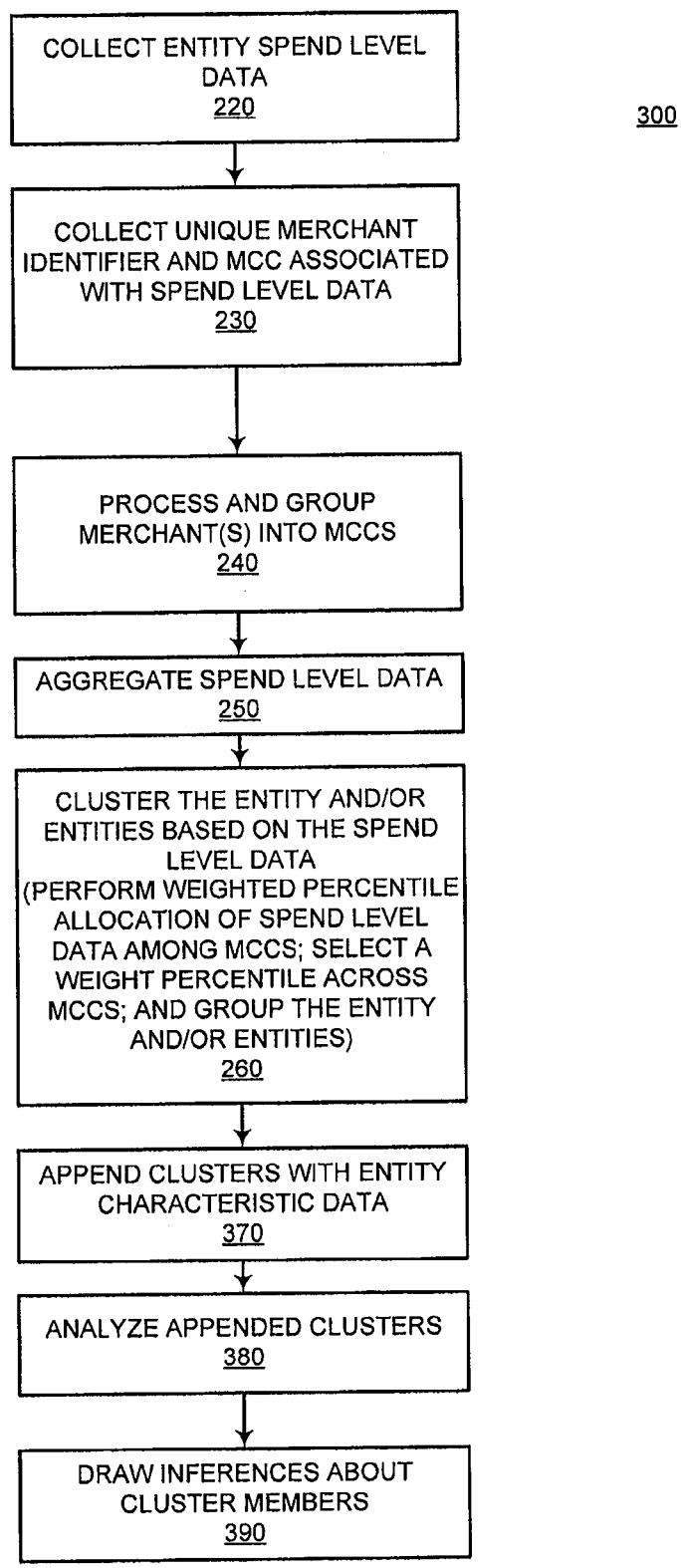
FIG. 4 is a representative process flow diagram for identifying attributes of cluster members based on spend level data, in accordance with one embodiment of the present invention.

In another exemplary embodiment with reference to FIG. 4, clusters are appended with characteristic data (370). In one embodiment, DALE 148 is configured to process requests, execute transactions, construct database queries, and/or execute queries against databases within enterprise data management system ("EDMS") 150. For instance, in response to a direction of a programming and/or a user 105, DALE 148 may execute a query of relationship management database (RM) 175, and/or consumer account database 155 for characteristic data. DALE 148, according to an algorithm, enriches cluster data with known entity characteristic data. The CM 149 is configured to format, sort, report or otherwise manipulate the enriched cluster data to prepare it for presentment, and present it to the user 105. This presentation may be via GUI, on a display, saved to a memory, printed, and/or output to an electronic device.

In an embodiment, clusters are appended with additional spend level data and/or characteristic data. For instance, spend level data, such as the type of items purchased by entities in a cluster, may be appended to clusters. In an embodiment, the amount of spend on a type of item by entities in a cluster, may be appended to clusters. This appended spend level data may be aggregated to determine and/or infer preferences, characteristics and attributes of the cluster members. In an embodiment, absent spend level data may be useful. For instance, information that an entity has not purchased a type of item, and/or item may be useful in determining and/or inferring preferences of a cluster and/or entity.

In an embodiment with renewed reference to FIG. 4, CLE 147 may compare and analyze the characteristic data of entities in a cluster to determine aggregate attributes and characteristics of the cluster (380). Aggregate characteristics of cluster members may include at least one of: average age of the cluster members, percentile categorization of age of the cluster members, percentage of each gender of the cluster members, average tenure of the cluster members, percentile categorization of tenure of the cluster members, percentile categorization of payment method types of the cluster members, martial status of the cluster members, percentage categorization of homeownership of the cluster members, percentile categorization of renters of the cluster members, percentile categorization of family member size of the cluster members, average family member size of the cluster members, percentile categorization of loyalty membership participation of the cluster members, average debt held by the cluster members, percentile categorization of debt held by the cluster members, percentile categorization of credit scores of the cluster members, percentile categorization of purchasing power of the cluster members, percentile categorization of activities preferred by the cluster members; percentile categorization of size of wallet of the cluster members, average credit score of the cluster members, average purchasing power of the cluster members, average size of wallet of the cluster members, percentage categorization of income spent on travel of the cluster members, percentile categorization of total money spent on a particular industry of a cluster members, top merchants within top merchant category, religious affiliation percentile categorization of a cluster members, percentile categorization of total money spent within a period on a particular hobby of a cluster members, average employment status of a cluster members, percentile categorization of types of employment of a cluster members, percentile categorization of sexual orientation of a cluster members, geographic location of a cluster members, percentile categorization of highest education level completed by a cluster members, percentile categorization of ethnicity of a cluster members, percentile categorization of handicap status of a cluster members, change in spending habits of a cluster members, percentile categorization of political affiliation of a cluster members, percentile categorization of affinity group membership of cluster members, percentile categorization of income level of cluster members, average frequency of transactions of cluster members, average frequency of transactions in a particular industry of cluster members, percentile categorization of income level of households of cluster members, or other suitable data.

For instance, DALE 148 may match entities within a predetermined cluster to information stored designating whether the entities are married or not. DALE 148 may perform a calculation and CM 149 may return measurable reporting to a user 105, such as the percentage of members within a cluster that are married. The clusters may be appended with any characteristic data and as many characteristic data characteristics that are useful. In one embodiment, DALE 148 incorporates a holistic view of characteristic data and assesses comprehensive demographic attributes, while also forming intelligent inferences based upon spend level data and other relevant data.

In an embodiment with renewed reference to FIG. 4, inferences and/or preferences about the entities may be drawn based upon a comparison and/or correlation of the characteristic data of the entities within a cluster (390). This comparison and/or correlation may include information that is present and information that is absent. For instance, if the entities within a cluster do not have any transactions with, or very few transactions with a particular industry MCC, CLE 147 may extrapolate that the entities within the cluster do not have attributes and/or preferences generally correlated with that industry MCC. This comparison and/or correlation and extrapolation may include inferences based on changes from historical inferences and/or information. Additionally, in one embodiment, if a first cluster member does not have data related to a particular characteristic, attribute or preference data, the aggregated data related to a particular characteristic, attribute or preference of the other cluster members may be substituted and/or inferred for the first cluster member.

Figure 5:
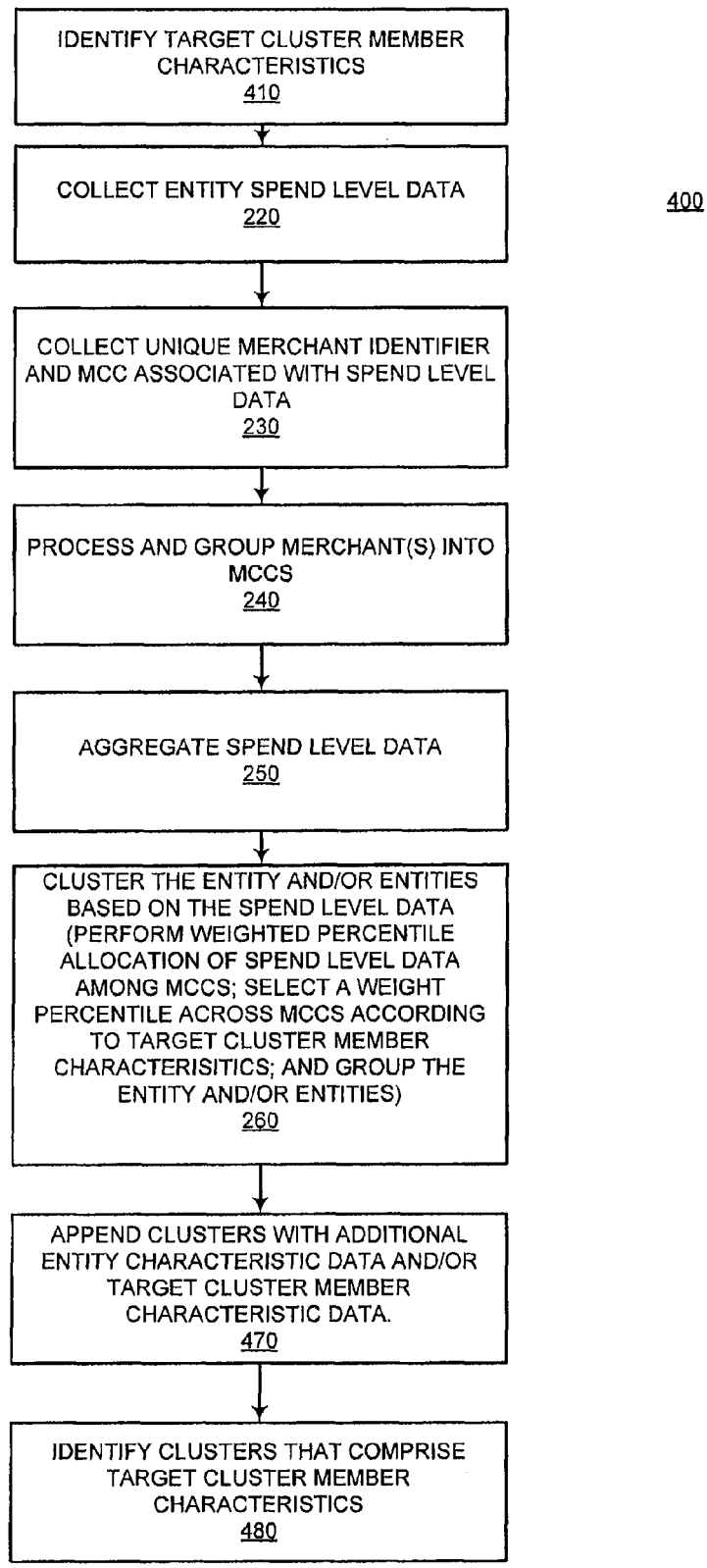
FIG. 5 is a representative process flow diagram for targeting entities that meet merchant criteria, in accordance with one embodiment of the present invention.

In one embodiment with reference to FIG. 5 and process flow diagram 400, a particular merchant may want to target a selection of entities based upon pre-selected target characteristics. In one embodiment, these target characteristics may be those that a particular merchant selects as useful for marketing purposes. In one embodiment, the target characteristics are identified (410). This identification may be made by a merchant, by a user, by a host, such as a financial processor and/or by a third party. In one embodiment, a merchant, a host, a user, and/or a third party may select values and/or thresholds for target characteristics. As previously disclosed in process flow diagram 200 (with renewed reference to FIG. 2) the spend level data is collected (220), aggregated (250), and clustered (260). In one embodiment, target characteristics are based on pre-selected levels of spend within pre-selected MCCs. In an embodiment, clustering includes CLE 147 selecting a weight percentile based on target characteristics across all or a subset of MCCs. In an embodiment, clustering includes CLE 147 grouping an entity with other entities based upon the selecting.

In an embodiment, the cluster data is appended with characteristic data that is limited to that data which a merchant selects as useful for marketing purposes (470). A marketing message may be based on the aggregated appended characteristic data.

In an embodiment, the appended cluster may be analyzed by the CLE 147 and/or DALE 148. A cluster may be further segmented based on target characteristics. For instance, a merchant may select for targeting a population of highly educated, married, high income, family members of 2 or less, that enjoy air travel and eating at restaurants. An appended cluster may include entities that enjoy air travel and eating at restaurants with a wide range of martial status, family member sizes, income and education levels. CLE 147 and/or DALE 148 may segment the cluster to the targeted population based on matching targeted values and/or exceeding thresholds.

The appended clusters may be assigned relevance values for selected targeted characteristic data. These cluster characteristic relevance values may be compared to pre-selected merchant relevance value thresholds. Clusters that exceed a selected threshold of relevance value(s) may be presented to the merchant for targeting, such as through direct marketing (480).

In an embodiment, the results of analyzing the appended cluster data may be used to target a population of entities, such as by a merchant. For instance, the results of analyzing the appended cluster data for all of the clusters may be queried by a merchant for desired target characteristics and cluster(s) matching the desired target characteristics are presented. In one embodiment, the cluster data may be useful for processes internal to a financial processor. In one embodiment, the cluster data may be transferred to a third party, such as a merchant and/or marketer, for the third parties needs. A host may use the cluster member attribute results to identify third parties interested in the data.

As previously disclosed in process flow diagram 200 (with renewed reference to FIGS. 2) the spend level data is gathered (220), aggregated (250), and clustered (260). Clusters with high levels of spend in a particular MCC may be introduced to merchants within those MCCs. In this way, a merchant may attract a competitor's consumers within the same MCC and/or may target their own previous consumers.

In an embodiment with renewed reference to FIG. 4, the clusters are appended with characteristic data (370). In one embodiment as disclosed above, the appended data is analyzed to determine characteristics and attributes of cluster members. In an embodiment, the appended data is analyzed to determine preferences and inferences of cluster members. The attributes of cluster members are compared and correlated in the DALE 148 and the CLE 147. The results of this analysis yield a profile of cluster members. Cluster members comprising desired target characteristics may be matched to merchants desiring target characteristics.

Figure 6:
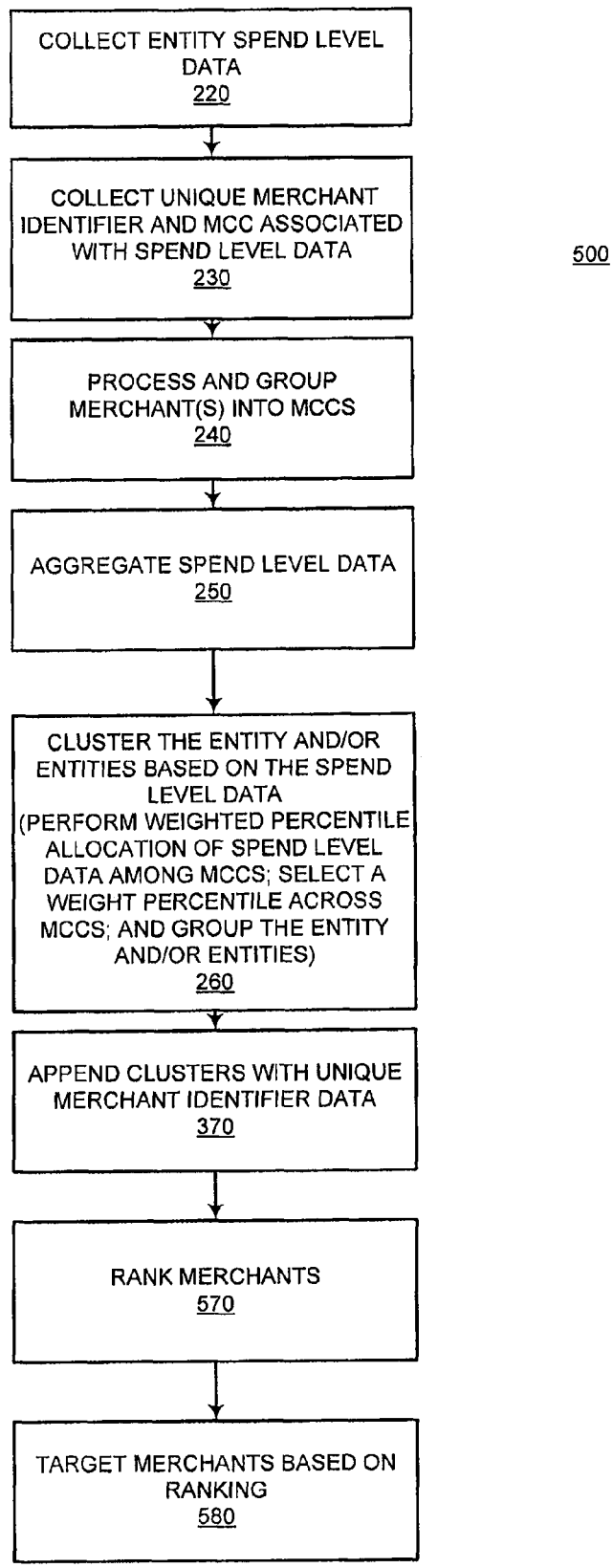
FIG. 6 is a representative process flow diagram for identifying a population of merchants based on spend level data of entities, in accordance with one embodiment of the present invention.
Figure 7:
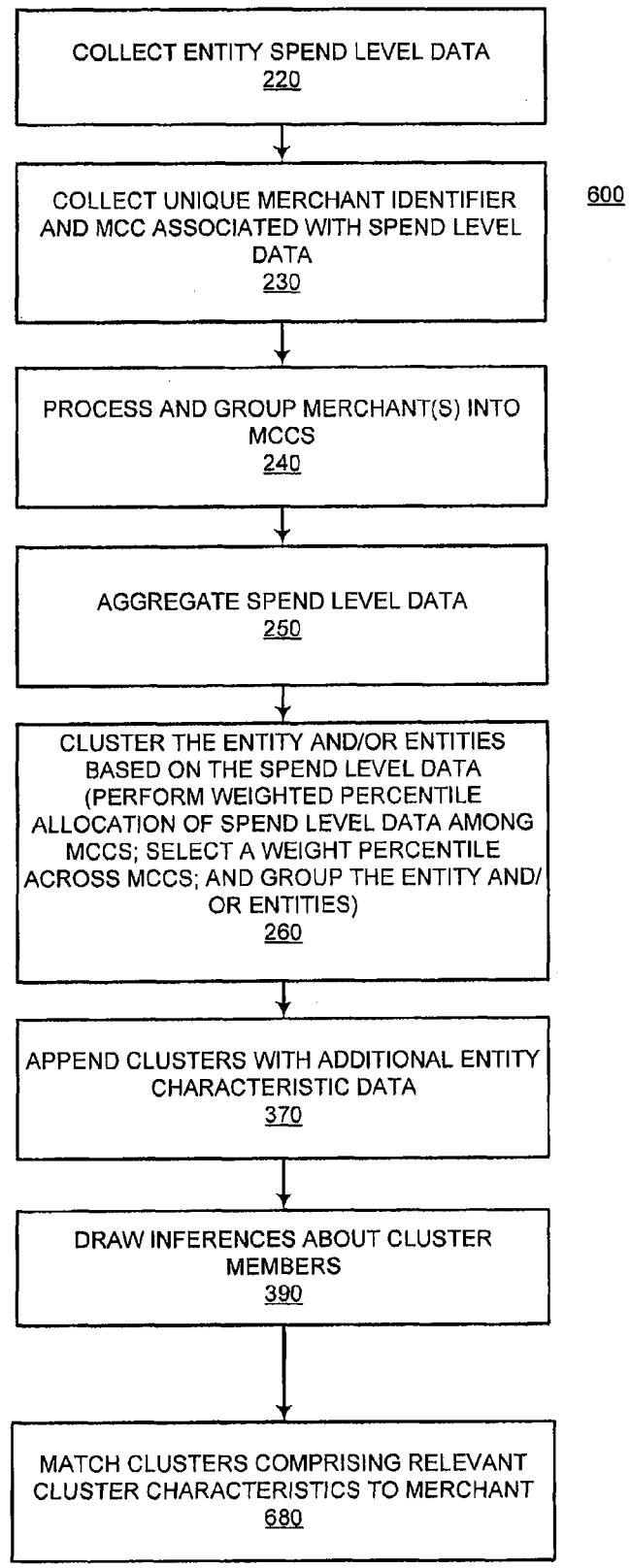
FIG. 7 is a representative process flow diagram for matching merchants to a cluster, in accordance with one embodiment of the present invention.
Figure 8:
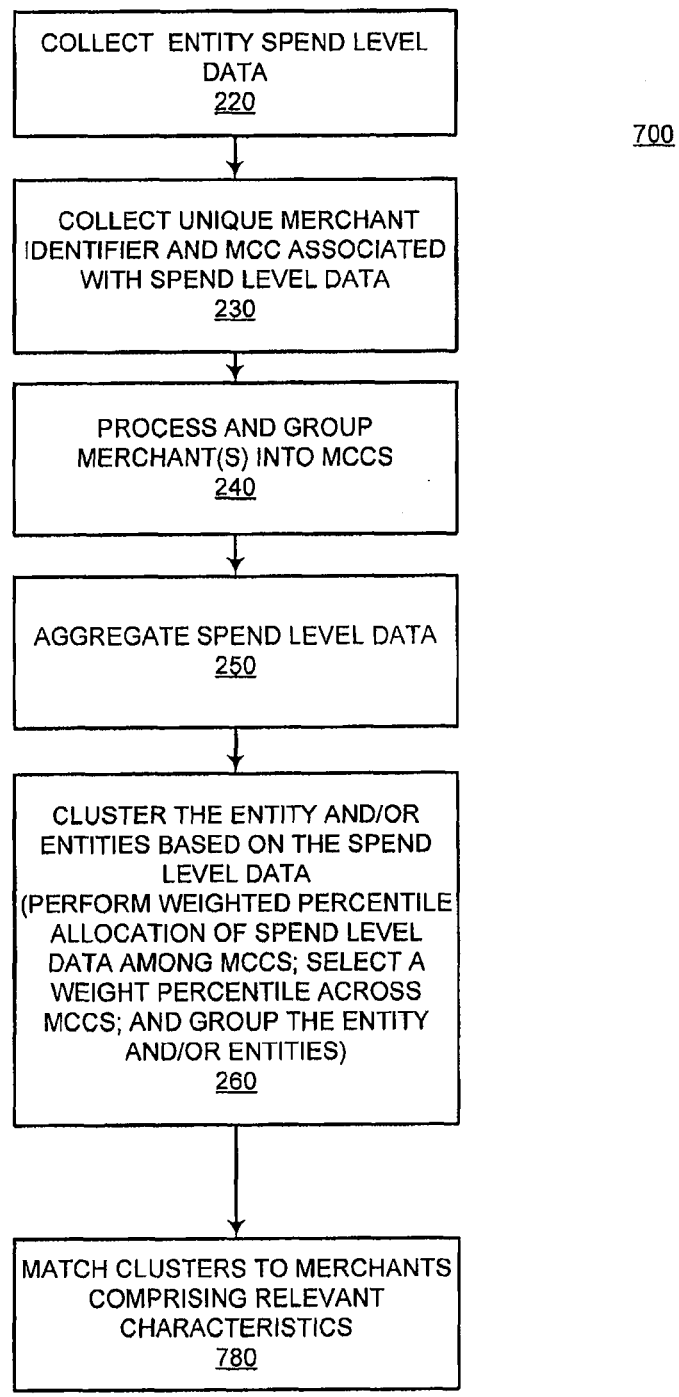
FIG. 8 is a representative process flow diagram for matching cluster members to a merchant based on spend level data, in accordance with one embodiment of the present invention.

In one embodiment with reference to FIG. 6 and process flow diagram 500, merchants may be matched to clusters and cluster members based on spend level data. In yet an embodiment, clustering includes CLE 147 assigning a weighted percentile to the spend level data of an entity, for merchants for a plurality of merchants. In an embodiment, merchant information may be based upon SE numbers. In an embodiment, clustering includes CLE 147 selecting a weight percentile across all merchants. In an embodiment, clustering includes CLE 147 grouping an entity with other entities based upon the selecting.

With renewed reference to FIG. 6, merchants may be ranked according to analysis of spend level data of cluster members (570). In one embodiment, merchants of a selected ranking and/or above a selected threshold may be targeted (580). For instance, in one embodiment, merchants comprising a selectable threshold and/or ranking of patronage among cluster members may be targeted by the host. In an embodiment, merchants comprising a selectable threshold and/or ranking of spend among cluster members may be targeted by the host. This targeting may be for third-party use of the system, cluster member contact information, tracking the results of marketing, forming relationships between a merchant and an entity and/or forming relationships between an entity and a merchant.

In one embodiment, merchants may be automatically matched to clusters based on spend level data. In an embodiment, this matching may be facilitated by comparing attributes of the merchants to aggregated attributes and/or inferred preferences of the cluster members. As previously disclosed in process flow diagrams 200 and 300 (with renewed reference to FIGS. 2 and 4) the spend level data is gathered (220), aggregated (250), clustered (260) and appended with characteristic data (370). In one embodiment with reference to FIG. 7, cluster characteristics are analyzed and identified (270). In one embodiment, merchants may be matched to the cluster (680).

Similar to the inference determination process disclosed in flow diagram 300, in one embodiment, CLE 147 processes data and stores information regarding merchant attributes in merchant database 185. The merchant attributes may include factual data or data based upon inference or some forecasting model. In one embodiment, this data may be provided by the merchants, provided by consumers, or provided by a third party. For instance, an expert review or ranking of a merchant may be obtained from a third-party data source. In one embodiment, expert reviews for various attributes are converted into a measurable merchant attribute. In one embodiment, a comparison of the analyzed appended cluster information is compared with merchant attribute information. This comparison may be used to infer preference of entities for a particular merchant and/or a particular class of merchants. In one embodiment merchants may be matcher to clusters using this comparison. In one embodiment, this comparison may be performed as an algorithm processed by the CLE 147.

In an embodiment, clusters may be matched to merchants based on spend level data. As previously disclosed in process flow diagram 200 (with renewed reference to FIG. 2) the spend level data is gathered (220), aggregated (250), and clustered (260). In one embodiment with reference to FIG. 8, merchants are ranked according to an algorithm in the CLE 147. In one embodiment, this ranking is based upon cluster entities spend frequency within a MCC. In an embodiment, this ranking is based upon cluster entities amount of spend within a MCC. Entities within the cluster may be introduced to the merchant within MCCs based upon the ranking of the merchants (780). In one embodiment, members of a cluster may have similar preferences to other members of their cluster. In one embodiment, if a merchant is preferred by a portion of the cluster, then the whole cluster may find value in being introduced to the merchant.

A comparison of an entity's first aggregated range of the entity's spend level data to a second aggregated range of the entity's spend level data may be performed by CLE 147. In one embodiment, the comparison may be for at least one of tracking the effectiveness of marketing, identifying changes in spend level data, and/or reassigning the entity's cluster.

Practitioners will appreciate that targeting marketing may be presented to an entity using a variety of methods or a combination of several methods such as direct mail, email, twitter, social networking portals, consumer invoices, specific discount offers, cross-marketing, cross-promotional materials, telemarketing, and the like. The entity's reaction to the targeting marketing may be measured by, for instance, clicking on the email, making a comment about a merchant, using a reward code, using a specific discount, and/or using a TXA in a transaction with the merchant. The reactions may be gathered in a feedback loop for consideration in future marketing processes.

Figure 9:
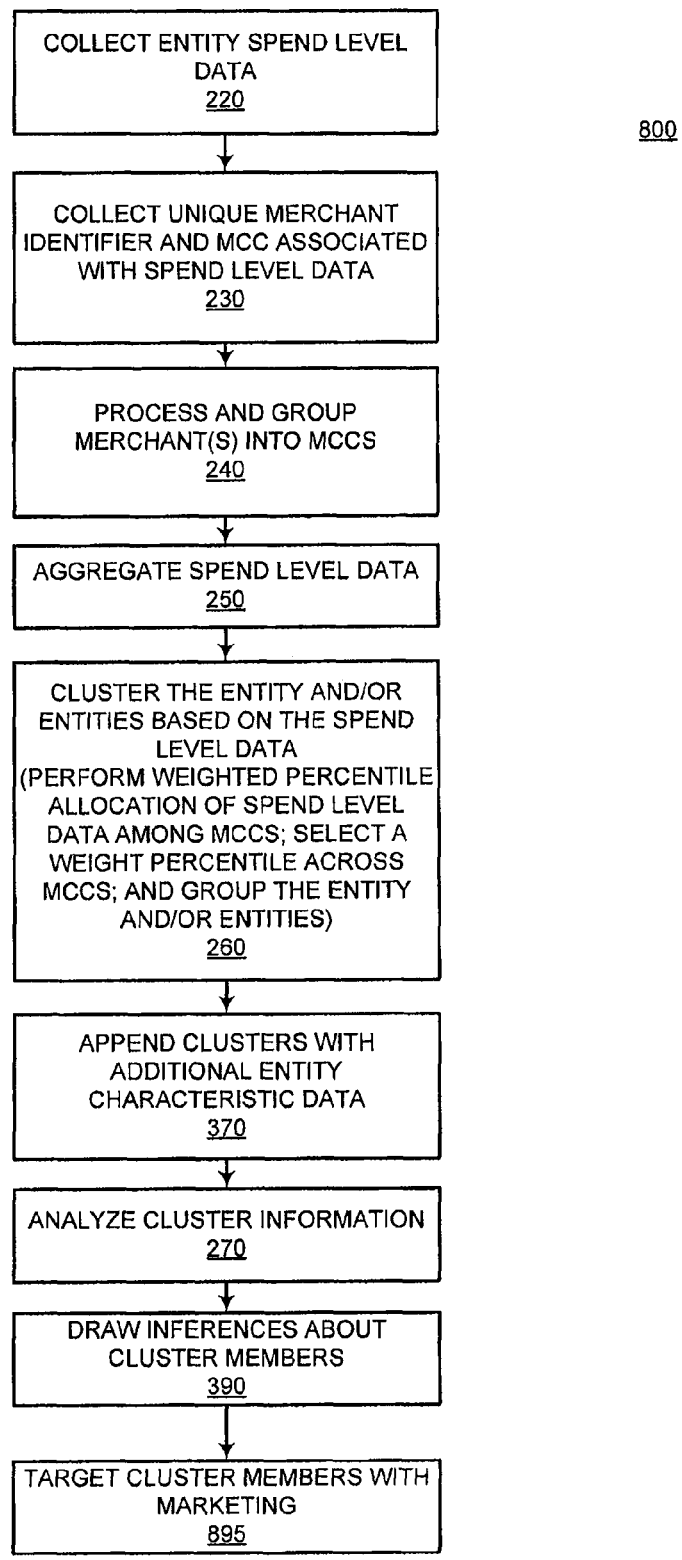
FIG. 9 is a representative process flow diagram for increasing marketing performance, in accordance with one embodiment of the present invention.

In one embodiment, with reference to FIG. 9, clustering entities may result in a smaller population with profiled attributes for targeted marketing proposes. As previously disclosed in process flow diagrams 200 and 300 (with renewed reference to FIGS. 2 and 4) the spend level data is gathered (220), aggregated (250), clustered (260) appended with characteristic data (370), analyzed (270) and preferences, attributes, and inferences of the cluster may be gleaned from the analyzing (390). The identified preferences and attributes may be matched to a merchant or group of merchant comprising similar or complementary preferences and attributes. The merchant may target this cluster with targeted marketing for particular goods and/or services (895). This may result in better results based upon the strength and broad pool of the spend level data. In one embodiment, the spend level data comprises a non-subjective metric for analysis.

Figure 10:
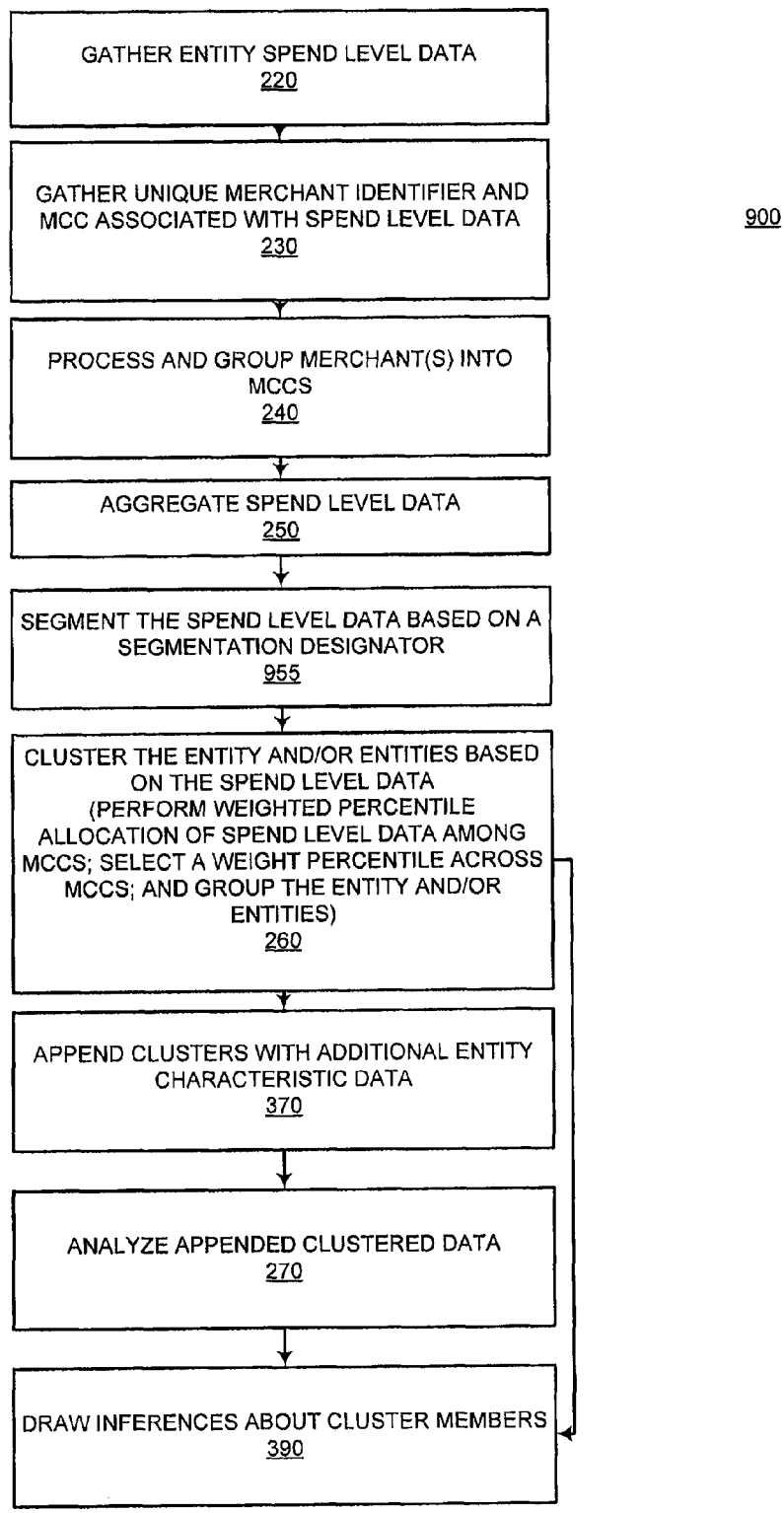
FIG. 10 is a representative process flow diagram for generating a cluster of entities pre-segmented by a demographic and/or characteristic, in accordance with one embodiment of the present invention.

In an embodiment with reference to FIG. 10, inferences related to particular characteristic data may be made. Similar to previously disclosed process flow diagram 200, (with renewed reference to FIG. 2) the spend level data may be gathered (220), and aggregated (250). However, in one embodiment, prior to clustering the entities based upon the spend level data, the spend level data may be pre-segmented by particular TX data, consumers account data, and/or characteristic data (955). In one embodiment, this TX data, consumers account data, and/or characteristic data may be a segmentation factor. The segmentation factor may be any suitable characteristic data, consumer account data or TX data element or elements. For instance, the spend level data may be segmented by a region, such as a zip code, and data collected from merchants within the selected region shall be processed by the system 115. This data may be clustered (260), assigned a weighed percentile, appended with characteristic information (370) and analyzed (270) in accordance with the previous descriptions disclosed with reference to FIGS. 2 and 4. Using this exemplary embodiment of the system, preferences, attributes, and inferences of a region, such as a zip code may be gleaned (390).

In an embodiment, the spend level data may be segmented by a gender of the entity, such as male, and only data collected from merchants in transactions with men shall be processed by the system 115. This data may be aggregated, clustered, assigned a weighed percentile and analyzed in accordance with the previous descriptions. Using this exemplary embodiment of the system, preferences, attributes, and inferences of a selected demographic may be gleaned. In one embodiment, spend level data segmented by zip code can reveal which geographic areas are most compelling to a merchant and/or marketer.

Any demographic included within the characteristic data may be selected for pre-segmenting the spend level data. In an embodiment, the spend level data may be segmented by an attribute, such as homeowner designation, and data collected from merchants in transactions with entities that are homeowners shall be processed by the system 115. This data may be aggregated, clustered, assigned a weighed percentile and analyzed in accordance with the previous descriptions. From this a holistic picture of homeowners segmented into different clusters may be created. More than one demographic or attribute may be selected and the spend level data may be pre-segmented any suitable number of times in any suitable order. Additionally, in one embodiment, a particular demographic could be selected to be removed from the larger set of all available spend level data. For instance, the spend level data of very high income entities may be selected for removal and data collected from merchants in transactions with very high income entities shall be excluded from processing by the system 115. The remaining data may be aggregated, clustered, assigned a weighed percentile and analyzed in accordance with the previous descriptions. Using this embodiment, outliers may be removed from the results.

Figure 11:
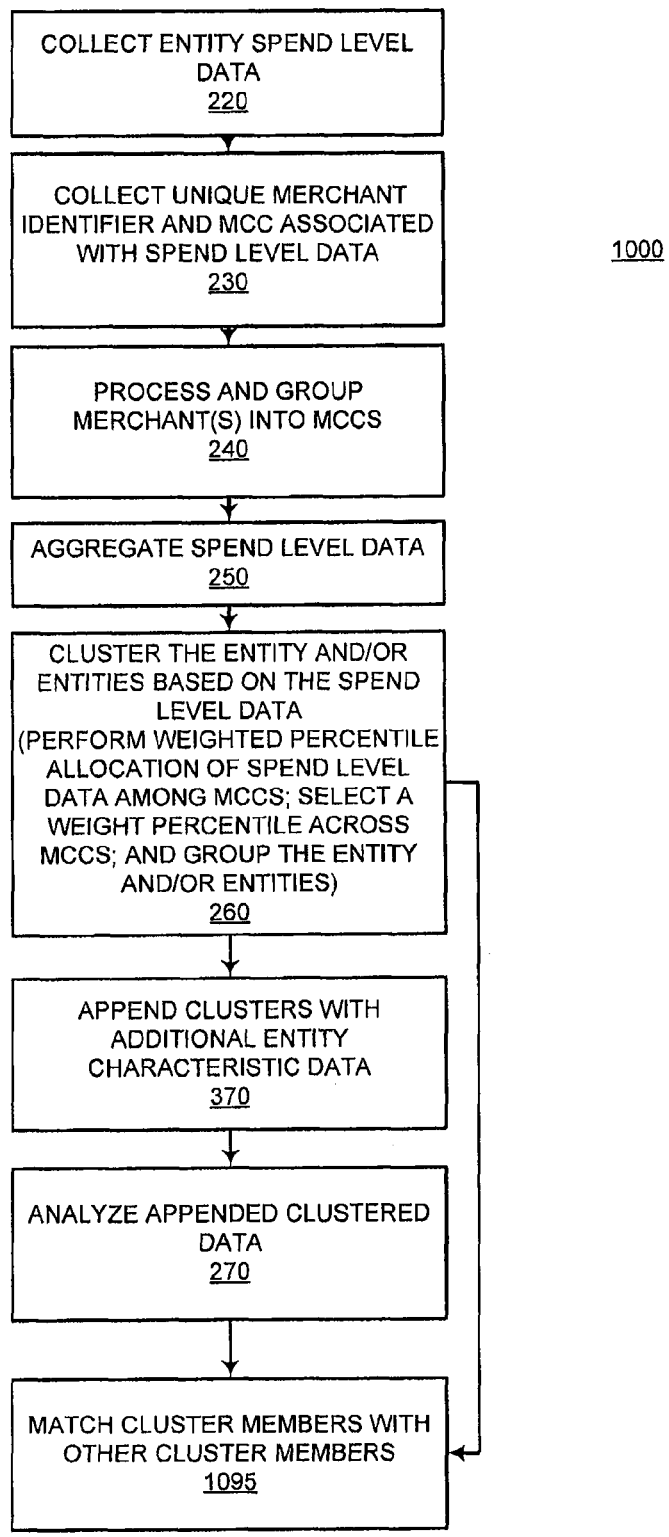
FIG. 11 is a representative process flow diagram for matching entities with other entities, based on spend level data, in accordance with one embodiment of the present invention.

In one embodiment, with reference to FIG. 11, clustering entities may result in a population of entities with similar preferences and attributes. As previously disclosed in process flow diagrams 200 and 300 (with renewed reference to FIGS. 2 and 4) the spend level data is gathered (220), aggregated (250), and clustered (260). In one embodiment, the members of each cluster may be introduced to each other (1095). In one embodiment, the spend habits of these members based on the spend level data may have a high correlation. These members may network, form relationships, communicate employment opportunities, communicate hobby information, disseminate information, communicate political messages, play games, communicate, interact, and or the like. An electronic communication platform may be utilized by the entities for communication and interaction. The electronic communication platform may include a website, blog, email, Twitter page and or the like.

In an embodiment, these clusters are appended with characteristic data (370), analyzed (270) and preferences, attributes, and inferences of the cluster may be gleaned (390). The aggregate preferences, attributes, and inferences of the cluster may comprise a cluster profile. Specialized electronic communication platforms which may include a website, blog, email, and/or Twitter pages may be created based on the profiles.

Figure 12:
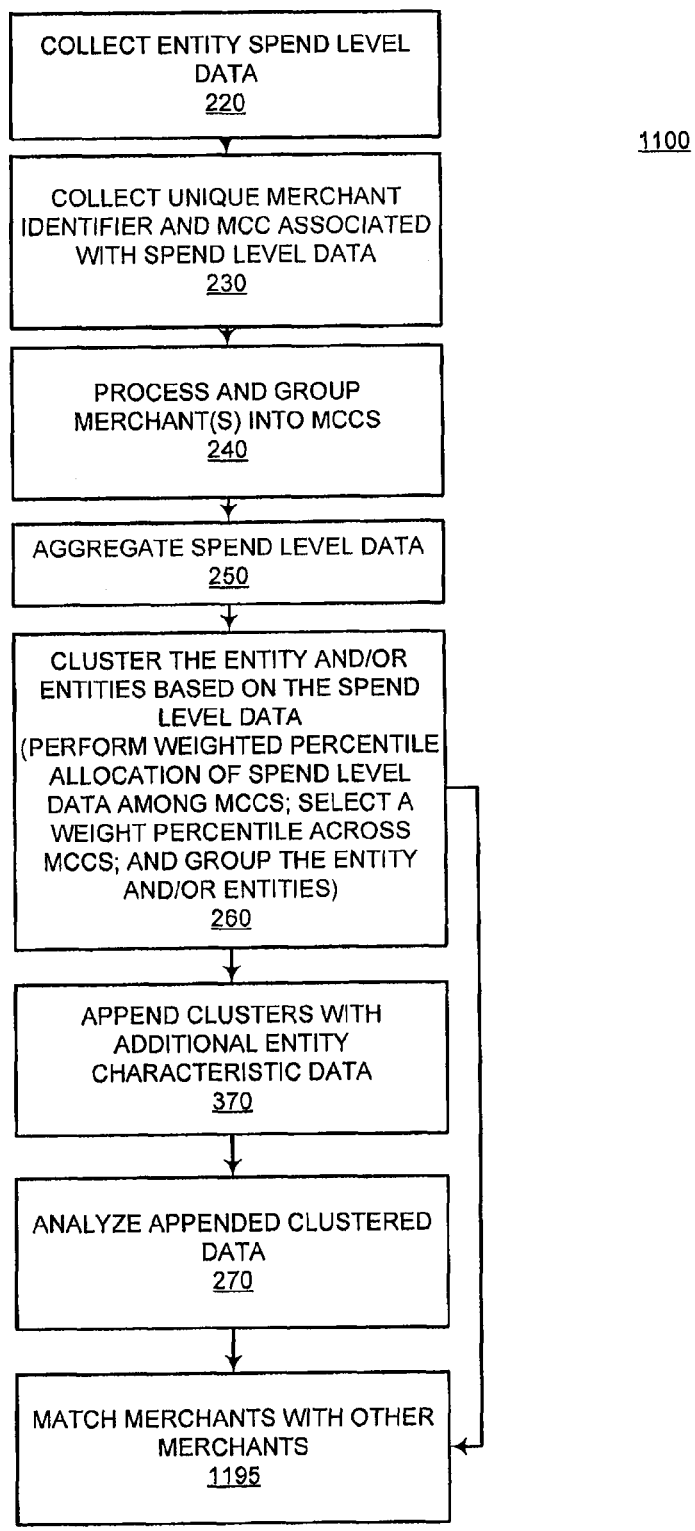
FIG. 12 is a representative process flow diagram for matching merchants with other merchants, based on spend level data, in accordance with one embodiment of the present invention.

In one embodiment, with reference to FIG. 12, clustering entities may result in a population that may be targeted with target marketing with high accuracy. As previously disclosed in process flow diagrams 200 and 300 (with renewed reference to FIGS. 2 and 4) the spend level data is gathered (220), aggregated (250), and clustered (260). In one embodiment, the merchants with a high correlation to a first cluster may be introduced to other merchants with a high correlation to the first cluster (1195). In an embodiment, these clusters are appended with characteristic data (370), analyzed (270) and preferences, attributes, and inferences of the cluster members may be gleaned (390). These preferences, attributes, and inferences of the cluster member may comprise a profile. In one embodiment, the merchants with a high correlation to each appended cluster may be introduced to other merchants with a high correlation to the cluster (1195). In an embodiment, these identified merchants or merchant may cross-promote with a financial processor. In one embodiment, merchants who have been introduced to other merchants may produce cross-promotions with each other a high level of effectiveness due to the client profiling. Merchants who have been introduced to other merchants may tailor their marketing messages to a plurality of clusters based on the cluster profiles.

While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims of the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above. Reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

We claim:

1. A computer-based method comprising:
    passively collecting, by a computer-based system for identifying attributes of a population using spend level data, the spend level data integral to information processed with a transaction of a plurality of customers, wherein the plurality of customers comprises a first customer;
    aggregating, by the computer-based system, the collected spend level data for a plurality of customers;
    clustering, by the computer-based system, the first customer with a subset of the plurality of customers, based on the spend level data of the first customer, wherein the clustering comprises;
        assigning, by the computer-based system, a weighted percentile to the spend level data of the first customer within a subset of a plurality of merchant category codes based on the volume of spend by each customer in each merchant category code of the subset of merchant category codes, wherein a merchant category code is assigned to each merchant and is based on the predominant business activity of the merchant;
        selecting, by the computer-based system, a weight percentile for each merchant category code across the subset of the plurality of merchant category codes; and
        grouping, by the computer-based system, the first customer with other customers based upon the customers' assigned weighted percentile proximity to the selected weight percentile for each merchant across the subject of the plurality of merchant category codes;

appending, by the computer-based system, the clustered data with customer characteristic data;

analyzing, by the computer-based system, the appended clustered data; and drawing, by the computer-based system, inferences about cluster members based on the analyzing.

2. The method of claim 1, the selected weight percentile is the median percentile of each cluster.

3. The method of claim 1, wherein the weighted percentile is a function of the total value of payments by a first customer to the merchants assigned a merchant category code as compared to other the total value of payments by other customers to merchants with the same assigned merchant category code.

4. The method of claim 1, wherein the spend level data comprises at least one of transaction data, or consumer account data.

5. The method of claim 1, wherein passively collecting spend level data of the first customer includes acquiring the spend level data from a merchant.

6. The method of claim 1, wherein passively collecting the spend level data of a first customer includes collecting the spend level data from a transaction database.

7. The method of claim 1, wherein passively collecting spend level data of the first customer includes acquiring the spend level data in response to a transaction by the first customer with a merchant.

8. The method of claim 1, wherein passively collecting spend level data of the first customer comprises at least one of reconciling the spend level data, transferring the spend level data to a host, organizing spend level data into a format, saving the spend level data to a memory, gathering the spend level data from the memory, or saving the spend level data to a database.

9. The method of claim 1, wherein aggregating the collected spend level data comprises combining a selectable range of collected spend level data.

10. The method of claim 1, wherein aggregating the collected spend level data comprises combining a selectable time range of collected spend level data.

11. The method of claim 10, wherein the selectable time range is 12 months.

12. The method of claim 1, wherein the clustering the customer based on the aggregated spend level data of a first customer comprises using a computer implemented statistical analysis algorithm to:

assign a weighted percentile to the spend level data of the first customer for spend level data assigned a merchant category code for a plurality of merchant category codes;

select a weight percentile across a merchant category codes; and group a first customer with other customer based upon the selecting.

13. The method of claim 1, further comprising using an appended cluster for at least one of advertising, market research, media planning, public relations, product pricing, product distribution, consumer support, sales strategy, community involvement, marketing, directing an entity to goods, directing an entity to services, drawing inferences about a cluster, directing the first customer to a second customer, or research.

14. The method of claim 1, wherein drawing inferences about cluster members comprises reporting measurable results based on the comparisons.

15. The method of claim 14, wherein the measurable results comprise at least one of age, payment method type, martial status, homeowner status, renter status, family member size, loyalty program membership, debt held, credit score, purchasing power, activities preferred, size of wallet, payments to a particular industry, top merchants within top merchant category, religious affiliation, employment status, sexual orientation, geographic highest education level completed, ethnicity, handicap status, change in spending habits, political affiliation, affinity group membership, income level, or frequency of transactions.

16. The method of claim 1, wherein drawing inferences about cluster members from appended clustered data comprises utilizing present and absent data.

17. A system comprising:

a processor for identifying attributes of a population using spend level data, a tangible, non-transitory memory configured to communicate with the processor, the tangible, non-transitory memory having instructions stored thereon that, in response to execution by the processor, cause the processor to perform operations comprising:

passively collect, by the processor, the spend level data integral to information processed with a transaction of a plurality of customers, wherein the plurality of customers comprises a first customer;

aggregate, by the processor, the collected spend level data for a plurality of customers;

cluster, by the processor, the first customer with a subset of the plurality of customers, based on the aggregated spend level data of the first customer, wherein the clustering comprises:

assigning, by the processor, a weighted percentile to the spend level data of the first customer within a subset of a plurality of merchant category codes based on the volume of spend by each customer in each merchant category code of the subset of merchant category codes, wherein a merchant category code is assigned to each merchant and is based on the predominant business activity of the merchant;

selecting, by the processor, a weight percentile for each merchant category code across the subset of the plurality of merchant category codes; and grouping, by the processor, the first customer with other customers based upon the customers' assigned weighted percentile proximity to the selected weight percentile for each merchant across the subset of the plurality of merchant category codes;

append, by the processor, the clustered data with customer characteristic data;

analyze, by the processor, the appended clustered data; and draw, by the processor, inferences about cluster members based on the analyzing.

18. An article of manufacture including a non-transitory, tangible computer readable storage medium having instructions stored thereon that, in response to execution by a computer-based system for identifying attributes of a population using spend level data, cause the computer-based system to perform operations comprising:

passively collect, by the computer-based system, the spend level data integral to information processed with a transaction of a plurality of customers, wherein the plurality of customers comprises a first customer;

aggregate, by the computer-based system, the collected spend level data for a plurality of customers; and cluster, by the computer-based system, the first customer with a subset of the plurality of customers, based on the aggregated spend level data of the first customer, wherein the clustering comprises:

assigning, by the computer-based system, a weighted percentile to the spend level data of the first customer within a subset of a plurality of merchant category codes based on the volume of spend by each customer each merchant category code of the subset of merchant category codes, wherein a merchant category code is assigned to each merchant and is based on the predominant business activity of the merchant;

selecting, by the computer-based system, a weight percentile for each merchant category code across the subset of the plurality of merchant category codes; and grouping, by the computer-based system, the first customer with other customers based upon the customers' assigned weighted percentile proximity to the selected weight percentile for each merchant across the subject of the plurality of merchant category codes;

append, by the computer-based system, the clustered data with customer characteristic data;

analyze, by the computer-based system, the appended clustered data; and draw, by the computer-based system, inferences about cluster members based on the analyzing.

* * * * *

UNITED STATES PATENT AND TRADEMARK OFFICE
CERTIFICATE OF CORRECTION

PATENT NO. : 8,571,919 B2  
APPLICATION NO. : 12/690693  
DATED : October 29, 2013  
INVENTOR(S) : Rajendra R. Rane Page 1 of 1

It is certified that error appears in the above-identified patent and that said Letters Patent is hereby corrected as shown below:

In the Claims

Column 25 Line 2, Claim 1, delete "subject" and insert therefor --subset--.

Column 27 Line 8, Claim 18, after "customer" insert --in--.

Column 27 Line 21, Claim 18, delete "subject" and insert therefor --subset--.

Signed and Sealed this  
Seventh Day of January, 2014

Margaret A. Focarino  
*Commissioner for Patents of the United States Patent and Trademark Office*